April 1, 1958     P. L. WILLIAMS     2,829,073
ANTI STICK COATING
Filed Sept. 26, 1955

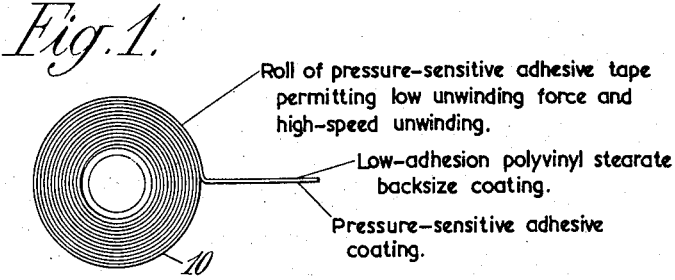

Fig. 1.
- Roll of pressure-sensitive adhesive tape permitting low unwinding force and high-speed unwinding.
- Low-adhesion polyvinyl stearate backsize coating.
- Pressure-sensitive adhesive coating.

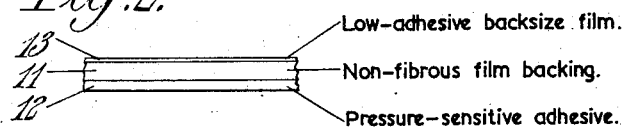

Fig. 2.
- Low-adhesive backsize film.
- Non-fibrous film backing.
- Pressure-sensitive adhesive.

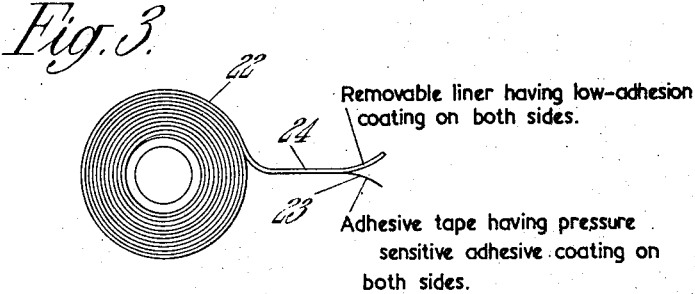

Fig. 3.
- Removable liner having low-adhesion coating on both sides.
- Adhesive tape having pressure sensitive adhesive coating on both sides.

Inventor
P. L. Williams
By Glascock Downing Seebold
Attys.

__United States Patent Office__

2,829,073
Patented Apr. 1, 1958

2,829,073
ANTI-STICK COATING

Philip L. Williams, Borehamwood, England, assignor to Adhesive Tapes Limited, Borehamwood, England Application September 26, 1955, Serial No. 536,738

Claims priority, application Great Britain October 1, 1954

9 Claims. (Cl. 117—161)

This invention relates to coating compositions having an unusually low affinity for pressure-sensitive adhesives, especially those of the rubber-resin type. Such compositions may be used, for example, as backcoatings for pressure-sensitive adhesive tapes, to provide rolls which may be easily unwound, without impairing the tackiness of the pressure-sensitive adhesive towards other surfaces. Or they may be applied to liners used for interleaving single or double-sided pressure-sensitive adhesive tape, sheets etc.

The pressure-sensitive adhesives which come into consideration are those based on natural and/or synthetic rubber. Natural rubber and certain of the synthetic rubbers (rubbery synthetic polymeric material) require or are improved by resinous tackifiers, as well known in the art, giving rise to pressure sensitive adhesives of the rubber-resin type. These synthetic rubbers include polyisobutylene and butyl rubber. Other synthetic rubbers, including rubbery polymers of vinyl ethyl ether and vinyl isobutyl ether, and certain acrylic polymers may, as is well known, be tackified by lower molecular weight polymer without incorporating a resinous tackifier.

It has been found that the desirable properties of low affinity for and inertness towards pressure sensitive adhesives are shown by coating compositions incorporating the polyvinyl esters of normal aliphatic fatty acids, hereinafter referred to as higher fatty acids, in which the fatty acid radical contains not less than sixteen carbon atoms. Examples are polyvinyl palmitate, stearate, arachidate and behenate.

Before giving a more detailed discussion of the chemistry of the present low-adhesion coating compositions, various illustrative products embodying the invention will be described in connection with the accompanying drawing. The products are shown in diagrammatic side or edge views in the various figures.

Figure 1 shows a roll 10 of pressure-sensitive adhesive tape wound directly upon itself. The tape has a normally tacky and pressure-sensitive adhesive coating on the face side, and a low-adhesion polyvinyl stearate backsize coating on the back side. The tape is wound so that the adhesive side is on the inside. In the roll, the backing serves not only as a permanent base or support for the tacky adhesive coating but also as a temporary liner since, in the latter connection, the backing in each turn of the roll temporarily contacts and covers the adhesive surface of the overlying turn. The limited adhesive between the backsize and the pressure-sensitive adhesive makes it possible to unwind the tape with less effort. Moreover, when the tape is unwound, there is less pull of the adhesive upon the back surface of the underlying convolution from which it is separated, thereby reducing the force tending to cause delamination of the tape structure and its constituent elements, and tending to cause breaking and tearing of the tape. The degree of adherency is sufficient to hold the wound tape in place and thus prevent spontaneous separation of the turns in the roll, without the need of any holding device (such as is needed in the case of rolls of non-tacky tape).

Figure 2 shows a magnified edge view of an illustrative tape having a non-fibrous film backing 11 coated on the face side with a normally tacky and pressure-sensitive adhesive 12 and on the back side with a low-adhesion polyvinyl stearate backsize film 13. The backsize results in the backing having a back surface which has a lower specific adhesion toward the pressure-sensitive adhesive layer than does the inner surface on which the adhesive layer is coated, and the resultant differential between the two surfaces aids in reducing or preventing offsetting of the adhesive when the tape is unwound from a roll.

Figure 3 shows a tape roll 22 formed of an adhesive tape 23 which is coated on both sides with a pressure-sensitive adhesive, and is laminated to a removable liner 24 of paper (flat or creped) or cloth which is coated on both sides with a polyvinyl stearate low-adhesion coating. The liner is thus interwound with the adhesive tape, and the latter is located in the roll between turns of the liner which prevents adjacent turns of the tacky tape from bonding together. The tape and liner are wound in so that the liner is on the outside. When drawn from the roll, the liner can be readily separated due to the low adherency. The low adherency reduces the unwinding effort.

In general, for practical reasons, the polyvinyl esters employed are not homopolymers of pure esters of one acid radical only. The polymeric molecules usually incorporate not only ester units derived from higher fatty acids, but also vinyl acetate units and sometimes vinyl alcohol units. Further, these esters are normally prepared from commercial fatty acids which are not pure substances, but comprise mixtures of homologous fatty acids with one component predominating. For convenience in what follows, therefore, the term "polyvinyl stearate" (for example) is to be taken as implying a mixed polyvinyl ester (equivalent to a copolymer) incorporating a proportion of vinyl ester derived from other fatty acids such as palmitic, and a further proportion (not necessarily minor) of lower vinyl ester units derived from normal aliphatic acids of less than 16 carbon atoms, such as acetate, with possibly vinyl alcohol units also. Similarly with the other esters mentioned.

The polyvinyl esters may be prepared by more than one method. Polyvinyl alcohol may be reacted with the appropriate acid chloride in the presence of a hydrogen chloride acceptor such as pyridine. Alternatively, the desired product may be obtained by an ester interchange reaction between the methyl or other suitable ester of the appropriate acid and polyvinyl acetate. Both of the above methods have been used with success, but other methods may also be employed. For example, an effective method might be found of esterifying polyvinyl alcohol directly with the acid; or the monomeric vinyl ester may be prepared by reaction between the acid and acetylene, and subsequently polymerized. The method of preparation is, however, immaterial as far as the present invention is concerned.

As well as copolymers of vinyl esters of higher fatty acids with vinyl esters of lower fatty acids, copolymers with other copolymerisable monomers may be employed. Such monomers may include, for example, allyl acetate and diesters and half esters of maleic acid.

It is evident that the group of polyvinyl esters described embraces materials of a rather wide range of composition. The efficacy of the material in the present connection depends on its composition in a manner which will be evident from the following considerations.

A polyvinyl ester of a higher fatty acid, such as stearic, differs markedly from a polyvinyl ester of a lower acid such as acetic, butyric, or caproic. The latter esters are, at low temperatures, transparent glassy solids, which on heating soften and melt gradually over a range of temperature to viscous, sticky liquids. Esters of palmitic and higher esters, however, are translucent waxy solids at room temperature, and melt comparatively sharply to transparent, highly viscous liquids. The melting point of a higher polyvinyl ester has been found to depend principally on the nature of the higher fatty acid from which it is derived; it increases with increasing length of the fatty acid molecule, and in fact there is a parallelism between the melting points of the polyvinyl esters and other simple derivatives of the same acids. The following melting points were determined on a series of polyvinyl esters, all made from the same sample of polyvinyl alcohol (Moviol N30-88, a product of fairly low viscosity and containing about 12% residual acetate, made by Farbwerke Hoechst A. G.) by reaction with excess of the appropriate acid chlorides in the presence of pyridine.

| | Melting point, °C. |
|---|---|
| Myristate | 16 |
| Palmitate | 30 |
| Stearate | 35 |
| Arachidate | 50 |
| Behenate | 54 |

The melting point also depends on the purity of the acid used. The above esters were all made from commercial acids, each containing a proportion of other fatty acids homologous with the main component; to this is ascribed the lack of regularity in the melting point series. A polyvinyl stearate made from an exceptionally pure (98%) stearic acid was found to melt at 43° C.

The melting point is substantially independent of the molecular weight of the polyvinyl alcohol or acetate used in making the higher ester, though higher molecular weight products melt to more viscous liquids than those of lower molecular weight.

It is thought that in these higher polyvinyl esters crystalline micelles can be formed in which the long side-chains are packed together in parallel alignment, and that melting of the polymer is associated with the break-up of these micelles. Such a hypothesis accounts satisfactorily for the physical characteristics of these materials. It appears that the higher acid radical must contain at least fourteen carbon atoms for this micelle formation to be possible, since no melting point phenomena have yet been detected in any polyvinyl ester lower than the myristate.

The question of melting point has been discused at some length, since it is of major importance in the present connection. It has been found that a film composed of, or incorporating, a given polyvinyl ester shows low-adhesion properties towards pressure-sensitive adhesives at temperatures below the melting point of the ester, but that these properties disappear above the melting point. Consequently, esters below the myristate, which do not possess a melting point, are useless in this respect. The myristate is of little practical value since its melting point is too low. The palmitate and higher esters are useful, their utility increasing with the number of carbon atoms in the fatty acid radical. The highest ester so far prepared and tested is the behenate, since behenic acid is the highest saturated fatty acid at present available commercially in reasonable quantities and in a reasonably pure state; but there is no doubt that higher esters, if available, would be even more satisfactory.

The esters are soluble in hydrocarbons, both aliphatic and aromatic, in halogenated hydrocarbons and in ethers. Low-adhesion coatings may comprise the polyvinyl esters either alone or in admixture with other polymeric materials, which may be employed either as extenders or to modify the physical properties of the coating. Other types of material may be incorporated in the coatings for special purposes, e. g. to secure a good bond between the coating and the surface to which it is applied.

It has been found that low-adhesion coatings may be based on polyvinyl esters having a molar proportion of higher vinyl ester units as low as about 30%. Their effectiveness decreases appreciably however, as this proportion is reduced, and it is preferred that the proportion should be not less than 60%.

The nature of the invention will now be more precisely described by the following examples.

*Example 1.*—A series of polyvinyl stearate-acetates was prepared by reacting polyvinyl alcohols, containing varying proportions of residual acetate, with excess of stearoyl chloride in the presence of anhydrous pyridine. The method was to heat the polyvinyl alcohol and pyridine together at 100° C. till the former was either completely dissolved or highly swollen, then to add the stearoyl chloride and mix it in thoroughly and finally to heat for a further half hour at 100° C. The product was purified by repeated extraction with boiling ethyl alcohol to remove pyridine, etc., and dried at 100° C.

The polyvinyl alcohols were all prepared by controlled alcoholysis of a commercial grade of polyvinyl acetate, Gelva 25, supplied by Shawinigan Ltd. Their residual acetate contents as determined by saponification, were respectively 72%, 56% and 21% molar. It was assumed that in the stearates prepared from them complete reaction took place, so that the respective stearate contents were taken as 28%, 44% and 79%, molar.

A thin coating (0.5–1.0 gram per square metre) of each stearate was applied to the surface of 600 substance "Cellophane" (registered trademark) regenerated cellulose film by making up a 5% (w./v.) solution of the stearate in benzene, applying to the film surface by means of a felt pad, and drying in air at approximately 60° C. The relative affinities of the coatings for a pressure sensitive adhesive of the natural rubber-resin type were estimated in the following way. A strip of coated film, 2" x 8" was firmly attached by its edges to a steel plate of the same size, the polyvinyl stearate coating being on the outside. A strip of pressure-sensitive adhesive tape, one inch wide, comprising a 600 substance "Cellophane" backing film carrying an adhesive comprising natural rubber and ester gum in approximately equal proportions was applied along the centre of the coating film strip and allowed to remain there for five minutes. The adhesive tape was then stripped off on a tensile testing machine with a pulling speed of 12 inches per minute, the angle of separation of the tape from the film being 180°; the average load required for stripping over a distance of five inches was measured in grams. A similar test was also made, for comparison, on uncoated "Cellophane" (registered trademark) film. A second series of tests was carried out in exactly the same way, except that the adhesive tape was allowed to remain in contact with the coated film for one week before being stripped off on the machine. The tests were made in a room kept at a constant temperature of 70° F. The adhesive tape used was all taken from a single roll. The adhesion values obtained were as follows:

| Molar Percent Stearate content of ester | Adhesion value (grams) | |
|---|---|---|
| | After 5 minutes | After one week |
| 28 | 113 | 580 |
| 44 | 92 | 240 |
| 79 | 65 | 88 |
| Uncoated "Cellophane" | 528 | 656 |

It is seen that after five minutes' contact of tape with film, the adhesions for the three coated films were all very much lower than that for the uncoated "Cellophane" (registered trademark). After one week's contact, all the adhesions were greater, but the increase was comparatively small with the ester of 79% stearate content and became greater as the stearate content decreased. It is for this reason that esters containing a high proportion of higher vinyl ester units are considered of the greatest practical value.

*Example 2.*—A sample of polyvinyl alcohol was prepared by controlled alcoholysis of Gelva 25 to give a residual acetate content of 49%. A series of polyvinyl alcohol-acetate-stearates was made from it by the procedure described in Example 1, except that varying amounts of stearoyl chloride, less than that required theoretically to react with all free hydroxyl groups, were employed. The amounts of free hydroxyl left in the final products were determined by acetylation, and from the results the percentages of vinyl stearate and vinyl alcohol units in the polymers were calculated assuming that in each case the proportion of vinyl acetate units remained unchanged at 49%. The stearate content varied from 32% to 49%. The toughness and film-forming properties of this type of product were found to improve as the free hydroxyl content increased.

The products were tested in exactly the same way as those of Example 1, with the following results:

| Molar Percent Stearate content of ester | Adhesion value (grams) | |
|---|---|---|
| | After 5 minutes | After one week |
| 52 | 90 | 392 |
| 35 | 92 | 334 |
| 40 | 102 | 362 |
| 49 | 72 | 286 |
| Uncoated "Cellophane" | 462 | 440 |

These coatings showed good low-adhesion properties after only five minutes' contact, but were less satisfactory after one week. Once again the adhesion value after one week showed a tendency to decrease with increasing stearate content of the ester.

*Example 3.*—A polyvinyl stearate was made in the manner described in Example 1, using a commercial grade of polyvinyl alcohol, Moviol N30–88, supplied by Farbwerke Hoeschst A. G., containing approximately 12% residual acetate.

Three coating solutions of the following compositions were made up:

| | A | B | C |
|---|---|---|---|
| Polyvinyl stearate gms | 2.5 | 0.5 | 0.25 |
| Alvar 1580 gms | | 2.0 | 2.25 |
| Vulcafor VCN gms | 0.25 | 0.25 | 0.25 |
| Benzene mls | 100 | 100 | 100 |

Alvar 1580 is a polyvinyl acetal made by Shawinigan Ltd.; it is derived from polyvinyl acetate (Gelva 15) by partial hydrolysis leaving 20% residual acetate, followed by reaction with acetaldehyde.

Vulcafor VCN is a mixture of approximately 80% toluylene 2.4 di-isocyanate and 20% toluene, and is supplied by Imperial Chemical Industries Ltd.; its purpose here was to improve the bond between the coatings and the "Cellophane" surfaces to which they were to be applied.

Coatings were applied from solutions A, B and C to lengths of "Cellophane" (registered trademark) film, 5½" wide and approximately 12 yards long. The coatings were dried at about 60° C. in air. The dry weight of coating was 0.5–1.0 gram per square metre. It was found that coatings B and C were superior to A in hardness and coherence, and were less readily disturbed by scratching or rubbing.

The other side of the "Cellophane" (registered trademark) was now coated with a pressure-sensitive adhesive comprising natural rubber and ester gum in approximately equal amounts, applied from a petrol solution. The solvent was allowed to evaporate at room temperature. The thickness of the pressure-sensitive adhesive layer when dry was 0.0012 inch. The "Cellophane" was wound up on a core, adhesive side inwards, and was then slit on a machine into small reels 1" wide. For comparison, a set of reels was made at the same time, using the same methods and materials, from Cellophane to which no backcoating had been applied.

The following tests were carried out on the slit reels:

(a) *Pull-off test.*—The reel was suspended by the free end of the tape and a weight of 1 lb. was attached to the core in such a way as not to interfere with the free unwinding of the tape. The time in seconds required for the unwinding of ten inches of tape under this load was measured.

(b) *Adhesion test.*—A length of tape was taken from the reel and applied to a polished stainless steel plate, adhesive side in contact with the plate. The tape was then stripped at an angle of 180° on a tensile testing machine, the average load required for stripping off at a pulling speed of 12 inches per minute being measured in grams.

Both the above tests were carried out in a room maintained at a constant temperature of 70° F. They were repeated several times on the same reels, at varying time intervals after making up. The results were as follows:

| Time after making up (days) | Pull-off values (seconds) Coating | | | | Adhesion values (grams) Coating | | | |
|---|---|---|---|---|---|---|---|---|
| | A | B | C | None | A | B | C | None |
| 3 | 30 | 32 | 16 | 111 | 848 | 906 | 806 | 766 |
| 24 | 41 | 28 | 28 | 90 | 722 | 822 | 776 | 778 |
| 46 | 50 | 31 | 38 | 98 | 811 | 818 | 772 | 810 |
| 60 | 48 | 46 | 61 | 111 | 794 | 722 | 772 | 732 |

It is seen that all three coated tapes gave lower pull-off values than the uncoated one; the difference was less evident, though still considerable, after sixty days than after three days. These lower pull-off values were not accompanied by any reduction in the adhesion value of the pressure-sensitive adhesive; indeed, the tendency was for the back-coated tapes to show higher adhesion values than the uncoated one. This is probably due to a lesser degree of disturbance of the adhesive surface on unwinding the coated tapes, owing to the easier release.

It is noteworthy that the efficacy of the coatings did not decrease as the proportion of polyvinyl stearate in them was reduced. Since Alvar 1580 is not a material showing low-adhesion properties towards pressure-sensitive adhesives, this fact suggests that, owing to lack of compatibility of polyvinyl stearate with Alvar, some separation occurred in coatings B and C to give a thin continuous layer of polyvinyl stearate on the outer surface.

*Example 4.*—Samples of polyvinyl stearate, arachidate and behenate were made by reaction of the appropriate acid chlorides with Moviol N30–88 in the presence of pyridine, as described in Example 1. A coating solution of the following composition was made up in the case of each ester:

| | | |
|---|---|---|
| Alvar 1579 | gms | 2 |
| Polyvinyl ester | gms | 0.5 |
| Vulcafor VCN | gms | 0.25 |
| Toluene | ml | 100 |

Alvar 1570 is a polyvinyl acetal similar to Alvar 1580 except that hydrolysis of the Gelva 15 is carried out to leave 30% residual acetate, before reaction with acetaldehyde.

Coatings were applied from these solutions to "Cellophane" which was subsequently made up into small reels of adhesive tape exactly as described in Example 3. A series of pull-off and adhesion tests was carried out on these reels with the following results:

St.=stearate coating
Ar.=arachidate coating
Be.=behenate coating
None=control, with no backcoating

| Time after making up (days) | Pull-off values (seconds) | | | | Adhesion values (grams) | | | |
|---|---|---|---|---|---|---|---|---|
| | St. | Ar. | Be. | None | St. | Ar. | Be. | None |
| 3 | 27 | 23 | 35 | 130 | 736 | 706 | 713 | 664 |
| 10 | 21 | 23 | 38 | 111 | | | | |
| 31 | 22 | 22 | 35 | 104 | | | | |
| 59 | 24 | 22 | 42 | 106 | 734 | 716 | 546 | 590 |

All the tapes having polyvinyl ester backcoatings are seen to give lower pull-off values than that with no backcoating, without impairment of the tackiness of the adhesive.

Whilst 0.5–1 gram per square meter is the preferred coating weight, less than 0.5 gram, for example as little as 0.2 gram per square meter, will afford an effect, especially if the coating consists of, or contains a high proportion of, the higher fatty acid vinyl ester polymer or copolymer.

It will be understood that the invention is not limited to regenerated cellulose film, but extends to other films used in the pressure-sensitive adhesive tape art, such as paper.

I claim:
1. A self-supporting film having a surface coating comprising a polymeric material incorporating higher fatty acid vinyl ester units, the coating exhibiting a lower affinity at room temperature for a rubber-resin type pressure-sensitive adhesive than does the film surface which is coated.
2. A film as set forth in claim 1, in which said polymeric material is polymerised higher fatty acid vinyl ester.
3. A film as set forth in claim 1, in which said polymeric material comprises higher fatty acid vinyl ester units and lower fatty acid vinyl ester units.
4. A film as set forth in claim 1, in which said polymeric material contains at least 60% molar of higher fatty acid vinyl ester units.
5. A self-supporting film having a surface coating comprising a polymeric material incorporating higher fatty acid vinyl ester units, and a polyvinyl acetal, the coating exhibiting a lower affinity at room temperature for a rubber-resin type pressure-sensitive adhesive than does the film surface which is coated.
6. A self-supporting film having a surface coating comprising a polymeric material incorporating higher fatty acid vinyl ester units, and an organic polyisocyanate, the coating exhibiting a lower affinity at room temperature for a rubber-resin type pressure-sensitive adhesive than does the film surface which is coated.
7. An adhesive coating composition comprising one part of toluylene 2:4-diisocyanate and about 10 parts of polyvinyl stearate.
8. An adhesive coating composition comprising one part of toluylene 2:4-diisocyanate, about 8 parts of polyvinyl acetal and about 2 parts of polyvinyl stearate.
9. An adhesive coating composition comprising one part of toluylene 2:4-diisocyanate, about 9 parts of polyvinyl acetal and about 1 part of polyvinyl stearate.

References Cited in the file of this patent
UNITED STATES PATENTS

| | | |
|---|---|---|
| 2,118,864 | Reppe | May 31, 1938 |
| 2,381,063 | Kung | Aug. 7, 1945 |
| 2,496,349 | Kellgren | Feb. 7, 1950 |
| 2,532,011 | Dahlquist | Nov. 28, 1950 |
| 2,558,548 | Eckey | June 26, 1951 |
| 2,682,484 | Thomas | June 29, 1954 |